United States Patent
Kumar et al.

(10) Patent No.: US 8,883,343 B2
(45) Date of Patent: Nov. 11, 2014

(54) EXTENDED RANGE ELECTRIC VEHICLE BATTERY CELL PACKAGING FOR POUCH DESIGN

(75) Inventors: Vinod Kumar, Pittsford, NY (US); Richard Deming, Jr., Bruce, MI (US)

(73) Assignee: GM Global Technology Operations LLC, Detroit, MI (US)

(*) Notice: Subject to any disclaimer, the term of this patent is extended or adjusted under 35 U.S.C. 154(b) by 462 days.

(21) Appl. No.: 12/692,800

(22) Filed: Jan. 25, 2010

(65) Prior Publication Data
US 2011/0183189 A1    Jul. 28, 2011

(51) Int. Cl.
| | |
|---|---|
| H01M 2/04 | (2006.01) |
| H01M 6/12 | (2006.01) |
| H01M 2/02 | (2006.01) |
| H01M 2/10 | (2006.01) |
| H01M 10/04 | (2006.01) |

(52) U.S. Cl.
CPC ............ H01M 2/0285 (2013.01); H01M 2/021 (2013.01); H01M 2/0275 (2013.01); H01M 2/0262 (2013.01); H01M 2/0237 (2013.01); *Y02E 60/12* (2013.01); H01M 2/0287 (2013.01); H01M 2/0212 (2013.01); H01M 2/0292 (2013.01); H01M 10/0486 (2013.01); H01M 10/0413 (2013.01); H01M 2/1016 (2013.01)

USPC ........... 429/176; 429/162; 429/177; 429/179; 429/186

(58) Field of Classification Search
CPC ............ H01M 2/0207–2/0215; H01M 2/0267; H01M 2/028; H01M 2/0282; H01M 2/0292
USPC .................................................. 429/176, 162
See application file for complete search history.

(56) References Cited

U.S. PATENT DOCUMENTS

2005/0017678 A1*  1/2005  Hiratsuka et al. ............. 320/112
2008/0241654 A1   10/2008  Koh et al.

FOREIGN PATENT DOCUMENTS

| CN | 1574415 A | 2/2005 |
|---|---|---|
| EP | 1717882 A1 | 11/2006 |
| WO | 2009011471 A1 | 1/2009 |

* cited by examiner

*Primary Examiner* — Barbara Gilliam
*Assistant Examiner* — Robert S Carrico
(74) *Attorney, Agent, or Firm* — Fraser Clemens Martin & Miller LLC; J. Douglas Miller

(57) ABSTRACT

A package for a battery cell is disclosed. The package includes a first sheet having a coating layer disposed thereon, a second sheet having a coating layer disposed thereon, the first sheet and the second sheet cooperating to form a cavity to receive the battery cell therein, and a frame disposed adjacent a portion of at least one of the first sheet and the second sheet, wherein the frame is coupled to at least one of the first sheet and the second sheet.

18 Claims, 3 Drawing Sheets

EXTENDED RANGE ELECTRIC VEHICLE BATTERY CELL PACKAGING FOR POUCH DESIGN

FIELD OF THE INVENTION

The present invention generally relates to battery cells. More particularly, the invention is directed to a package for a battery cell and a method for packaging a battery cell.

BACKGROUND OF THE INVENTION

Current battery cell pouches and packages include two polymer coated aluminum layers that are heat fused around a periphery thereof to enclose a battery cell therein. Conventional packages have flexible edges which do not allow for a robust datuming during a battery pack assembly process. Additionally, an exposed edge of any of the aluminum layers creates a risk of electrical shorting.

It would be desirable to have a package for a battery cell and a method of packaging a battery cell, wherein the package and the method provide a suitable rigidity for datuming and minimize a risk for electrical shorting.

SUMMARY OF THE INVENTION

Concordant and consistent with the present invention, a package for battery cell and a method of packaging a battery cell, wherein the package and the method provide a suitable rigidity for datuming and minimize a risk for electrical shorting, has surprisingly been discovered.

In one embodiment, a package for a battery cell comprises: a first sheet having a coating layer disposed thereon; a second sheet having a coating layer disposed thereon, the first sheet and the second sheet cooperating to form a cavity to receive the battery cell therein; and a frame disposed adjacent a portion of at least one of the first sheet and the second sheet, wherein the frame is coupled to at least one of the first sheet and the second sheet.

In another embodiment, a battery package comprises: a first sheet having a coating layer disposed thereon; a second sheet having a coating layer disposed thereon, the first sheet and the second sheet cooperating to form a cavity therebetween; a battery cell disposed in the cavity formed between the first sheet and the second sheet; and a rigid frame disposed between a portion of the first sheet and a portion of the second sheet, wherein the frame is fused to the coating layer of at least one of the first sheet and the second sheet.

In yet another embodiment, a battery package comprises: a first sheet having a coating layer disposed thereon; a second sheet having a coating layer disposed thereon, the first sheet and the second sheet cooperating to form a cavity therebetween; a battery cell disposed in the cavity formed between the first sheet and the second sheet, the battery cell having a cell tab protruding therefrom; and a rigid frame disposed between the first sheet and the second sheet around at least a portion of the periphery of the first sheet and the second sheet, wherein the frame is fused to the coating layer of at least one of the first sheet and the second sheet, and wherein the frame include a notched portion to receive the cell tab therethrough.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
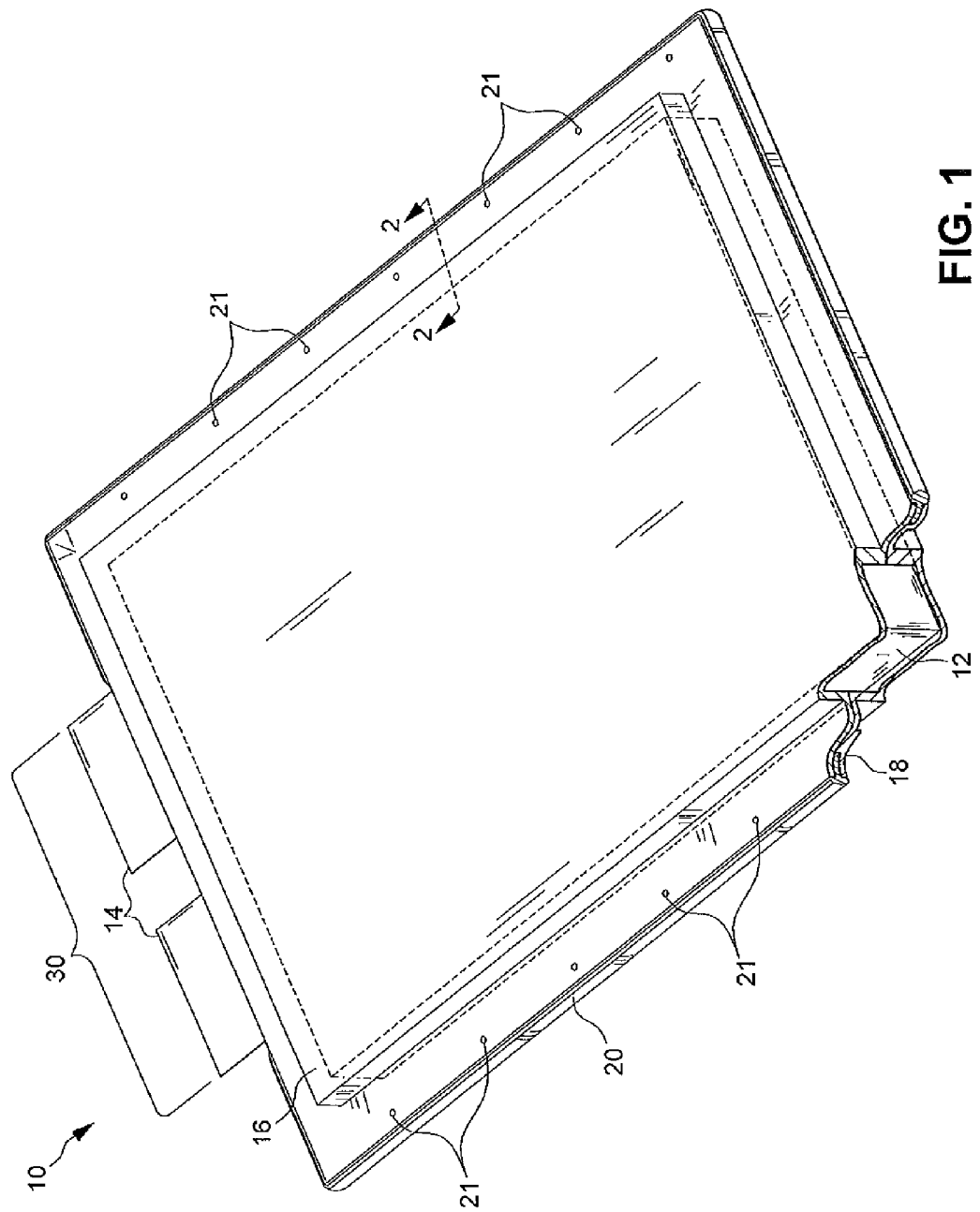
FIG. 1 is a rear perspective view of a package for a battery cell according to an embodiment of the present invention, showing a cut-away portion of the package.
Figure 2:
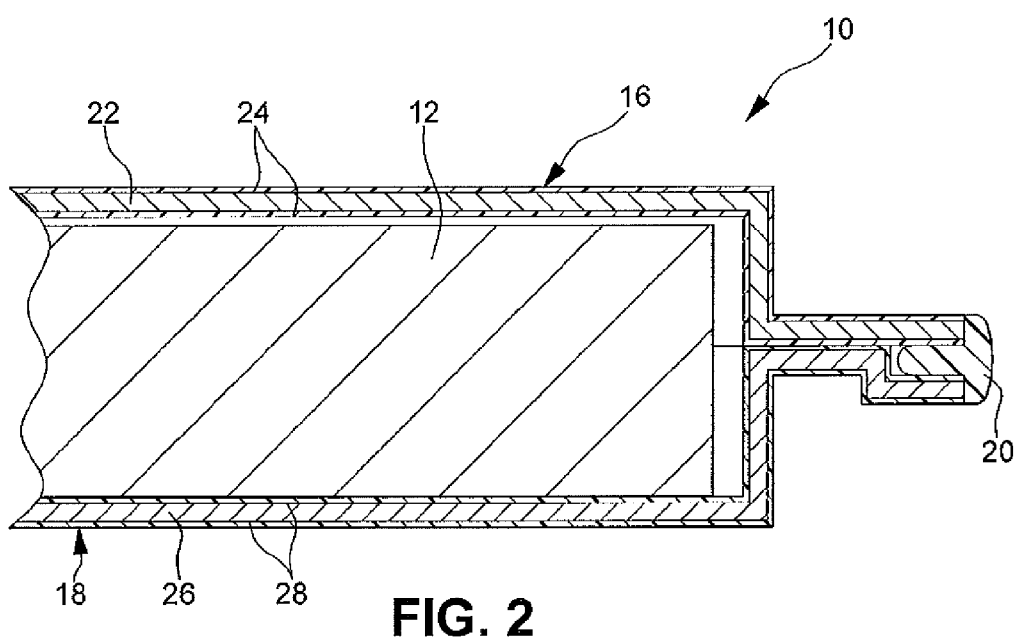
FIG. 2 is a fragmentary cross-sectional elevational view of the package of FIG. 1, taken along line 2-2.

FIGS. 1 and 2 illustrate a package 10 for substantially enclosing a battery cell 12 according to an embodiment of the present invention. As a non-limiting example, the battery cell 12 is a battery for an extended range electric vehicle (EREV) having a plurality of cell tabs 14. However, other battery cells may be disposed in the package 10.

As shown, the package 10 includes a first sheet 16, a second sheet 18, and a substantially rigid frame 20 interposed between at least a portion of the first sheet 16 and a portion of the second sheet 18. However, it is understood that the first sheet 16 can be heat fused to the second sheet 18 with the frame 20 coupled around a peripheral edge of at least one of the first sheet 16 and the second sheet 18. As a non-limiting example, the frame 20 is integrally formed with at least one of the first sheet 16 and the second sheet 18. However, the frame 20 may be a separately formed component.

The package 10 also includes a plurality of datum features 21 formed therein. In the embodiment shown, the datum features 21 are locator holes formed adjacent a periphery of the package 10 and through a laterally inward portion of the frame 20 disposed between the sheets 16, 18. In certain embodiments, the datum features 21 are formed in a portion of the frame 20 extending outwardly beyond a periphery of at least one of the first sheet 16 and the second sheet 18. However, any datum feature and location may be used.

As more clearly shown in FIG. 2, the first sheet 16 is a multi-layer sheet having a core layer 22 sandwiched between a plurality of coating layers 24. The core layer 20 is formed from a metal such as aluminum. However, other metals and materials may be used. Each of the coating layers 24 is formed from a plastic or polymer. However, other non-conductive materials may be used.

Similar to the first sheet 16, the second sheet 18 is a multi-layer sheet having a core layer 26 sandwiched between a plurality of coating layers 28. The core layer 26 is formed from a metal such as aluminum. However, other metals and materials may be used. Each of the coating layers 28 is formed from a plastic or polymer. However, other non-conductive materials may be used.

The frame 20 is typically formed from a polymer having a rigidity suitable for robust datuming. As a non-limiting example, the frame 20 is formed from the same material as at least one of the coating layers 24, 28. It is understood that the frame 20 may have any size and shape, as desired. It is further understood that the frame 20 may be disposed around any portion of the first sheet 16 and the second sheet 18.

The package 10 includes a notched portion 30 to receive the cell tabs 14 therein. In the embodiment shown in FIG. 1, the notched portion 30 is a portion of the package 10 where the frame 20 is not disposed between the first sheet 16 and the second sheet 18. The absence of the frame 20 reduces a thickness of the package 10 and minimizes a bulge of the package 10 due to the cell tabs 14 protruding therethrough. It is understood that the notched portion 30 may be used to align the battery cell 12 with any portion of the package 10 such as the frame 20, for example. It is further understood that the notched portion 30 may be a portion of the frame 20 wherein a thickness of the notched portion 30 of the frame 20 is less than other portions thereof.

In use, the first sheet 16 and the second sheet 18 are disposed adjacent each other with the frame 20 disposed adjacent a peripheral edge of at least one of the first sheet 16 and the second sheet 18. In certain embodiments, the frame 20 is adhered to a peripheral edge of at least one of the first sheet 16 and the second sheet 18. In certain embodiments, the frame 20 is disposed between a portion of the first sheet 16 and a portion of the second sheet 18.

The first sheet 16 and the second sheet 18 are forced together to enclose the battery cell 12 therein. As a non-limiting example, the sheets 16, 18 are fused together using a conventional matched metal die process or "butter dishing" process, wherein the frame 20 is sandwiched between the first sheet 16 and the second sheet 18 around at least a portion of a respective peripheries thereof. The frame 20 may be disposed around any portion of the package 10, as desired. In the embodiment shown, the package 10 includes the notched portion 30 having no frame 20 disposed between the first sheet 16 and the second sheet 18 to receive the cell tabs 14 therein. It is understood that the frame 20 may also undergo a registering process to locate the frame 20 at a pre-determined position relative to the first sheet 16 and the second sheet 18. Where the frame 20 is integral with at least one of the first sheet 16 and the second sheet 18, a clamping procedure of the first sheet 16 and the second sheet 18 fuses the integral frame 20 therebetween.

In certain embodiments, the frame 20 is made of the same or similar material as the coating layers 24, 28. Accordingly, the frame 20 is fused to the coating layers 24, 28 to form a sealed edge around a periphery of the package 10. Therefore, no adhesive is required to couple the first sheet 16 to the second sheet 18. As a non-limiting example, a portion of the frame 20 extends around an outside edge of the first sheet 16 and the second sheet 18 to cover any exposed portion of the core layers 22, 26 of the first sheet 16 and the second sheet 18. It is understood that the frame 20 may be formed around an edge of at least one of the first sheet 16 and the second sheet 18 using any processes such as a flashing process and a welding process, for example. It is further understood that a portion of at least one of the coating layers 24, 28 may be formed around an exposed edge of at least one of the core layers 22, 26.

Figure 3:
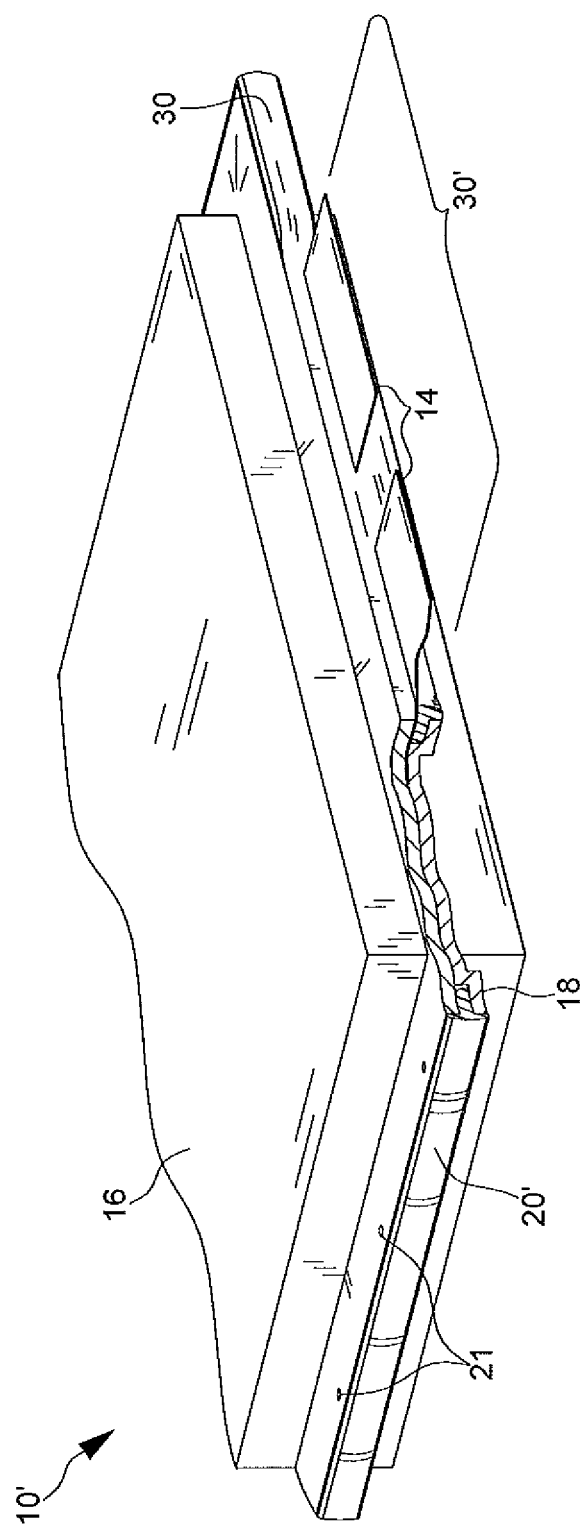
FIG. 3 is a fragmentary front perspective view of a package for a battery cell according to another embodiment of the present invention, showing a cut-away portion of the package.

FIG. 3. Illustrates a package 10' for substantially enclosing a battery cell 12 according to another embodiment of the present invention similar to the package 10 of FIGS. 1 and 2, except as described below. Structure repeated from the description of FIGS. 1 and 2 includes the same reference numeral. Variations of structure shown in FIGS. 1 and 2 include the same reference numeral and a prime (') symbol.

As shown, the frame 20' includes a notched portion 30', wherein a portion of the frame 20' is removed or "notched". The notched portion 30' of the frame 20' is disposed to receive the cell tabs 14 therein. Specifically, the notch portion 30' includes a portion of the frame 20' disposed between only the second sheet 18 and the cell tabs 14. It is understood that the frame 20' may be disposed between at least one of the first sheet 16 and the cell tabs 14 and the second sheet 18 and the cell tabs 14. As a non-limiting example, the notched portion 30' of the frame 20' is flashed or welded to fuse with at least one of the first sheet 16 and the second sheet 18 to create an isolative barrier between the cell tabs 14 and the at least one of the first sheet 16 and the second sheet 18. It is understood that the notched portion 30' may be used to align the battery cell 12 with any portion of the package 10' such as the frame 20', for example. It is further understood that the frame 20' may be disposed around any portion of the first sheet 16 and the second sheet 18.

In use, the first sheet 16 and the second sheet 18 are disposed adjacent each other with the frame 20' disposed therebetween. It is understood that, in certain embodiments, the frame 20 is adhered to a peripheral edge of at least one of the first sheet 16 and the second sheet 18. The first sheet 16 and the second sheet 18 are forced together to enclose the battery cell 12 therein. As a non-limiting example, the sheets 16, 18 are fused together using a conventional matched metal die process or "butter dishing" process, wherein the frame 20' is sandwiched between the first sheet 16 and the second sheet 18 around at least a portion of respective peripheries thereof. The frame 20' may be disposed around any portion of the package 10', as desired. In the embodiment shown, the frame 20' includes the notched portion 30' to minimize a thickness of the package 10' at a portion where the cell tabs 14 protrude therethrough. It is understood that the frame 20' may undergo a registering process to locate the frame 20' at a pre-determined position relative to the first sheet 16 and the second sheet 18. Where the frame 20' is integral with at least one of the first sheet 16 and the second sheet 18, a damping procedure of the first sheet 16 and the second sheet 18 fuses the integral frame 20' therebetween.

The package 10, 10' and methods provide a suitable rigidity for datuming and minimize a risk for electrical shorting. Specifically, the frame 20, 20' adds a mechanical rigidity to a peripheral edge of the package 10, 10' to facilitate robust datuming strategies for cell pouch assembly (e.g. at a battery cell plant) and battery pack assembly (e.g. at battery pack assembly plant). The frame 20, 20' also provides separation between the sheets 16, 18 at the peripheral edges of the package 10, 10', thereby reducing the risk of electrical shorts from the cell tabs 14 to an exposed conductive portion of the package 10, 10'.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A package for a battery cell, the package comprising:
   a first sheet having a coating layer disposed thereon and a first sheet peripheral rim;
   a second sheet having a coating layer disposed thereon and a second sheet peripheral rim, the first sheet and the second sheet cooperating to define a cavity therebetween when the first sheet peripheral rim is adjacent the second sheet peripheral rim, the battery cell disposed in the cavity; and
   a frame disposed between the first sheet peripheral rim and the second sheet peripheral rim adjacent abutting portions of the first sheet peripheral rim and the second sheet peripheral rim, the first sheet peripheral rim directly contacting the second sheet peripheral rim at the abutting portions, wherein the frame also extends around an outside edge of each of the first sheet peripheral rim and the second sheet peripheral rim to directly contact and cover the outside edges of the first sheet peripheral rim and the second sheet peripheral rim.

2. The package according to claim 1, wherein at least one of the first sheet and the second sheet includes a core layer formed from a metal.

3. The package according to claim 1, wherein the coating layer of at least one of the first sheet and the second sheet is formed from a plastic.

4. The package according to claim 1, wherein the frame is formed from a rigid plastic suitable for robust datuming.

5. The package according to claim 1, wherein the frame is formed from the same material as the coating layer of at least one of the first sheet and the second sheet.

6. The package according to claim 1, wherein the frame is disposed around at least a portion of the periphery of the first sheet and the second sheet.

7. The package according to claim 1, wherein the frame includes a datum feature formed therein.

8. The package according to claim 1, wherein the frame is integrally formed with at least one of the first sheet and the second sheet.

9. A battery package comprising:
a first sheet having a coating layer disposed thereon and a first sheet peripheral rim;
a second sheet having a coating layer disposed thereon and a second sheet peripheral rim, the first sheet and the second sheet cooperating to define a cavity therebetween when the first sheet peripheral rim is adjacent the second sheet peripheral rim;
a battery cell disposed in the cavity formed between the first sheet and the second sheet; and
a rigid frame suitable for robust datuming and disposed between the first sheet peripheral rim and the second sheet peripheral rim adjacent abutting portions of the first sheet peripheral rim and the second sheet peripheral rim, the first sheet peripheral rim directly contacting the second sheet peripheral rim at the abutting portions, wherein the frame also extends around an outside edge of each of the first sheet peripheral rim and the second sheet peripheral rim to directly contact and cover the outside edges of the first sheet peripheral rim and the second sheet peripheral rim.

10. The battery package according to claim 9, wherein at least one of the first sheet and the second sheet includes a core layer formed from a metal.

11. The battery package according to claim 9, wherein the coating layer of at least one of the first sheet and the second sheet is formed from a plastic.

12. The battery package according to claim 9, wherein the frame is formed from a rigid plastic suitable for robust datuming.

13. The battery package according to claim 9, wherein the frame is formed from the same material as the coating layer of at least one of the first sheet and the second sheet.

14. The battery package according to claim 9, wherein the frame is disposed around at least a portion of the periphery of the first sheet and the second sheet.

15. The battery package according to claim 9, wherein the frame includes a datum feature formed therein.

16. The battery package according to claim 9, wherein the battery cell includes at least one tab extending therefrom and a portion of the frame electrically insulates the first sheet and the second sheet from the tab.

17. The battery package according to claim 16, wherein the frame includes a notched portion for receiving the at least one cell tab.

18. A battery package comprising:
a first sheet having a coating layer disposed thereon and a first sheet peripheral rim;
a second sheet having a coating layer disposed thereon and a second sheet peripheral rim, the first sheet and the second sheet cooperating to define a cavity therebetween when the first sheet peripheral rim is adjacent the second sheet peripheral rim;
a battery cell disposed in the cavity between the first sheet and the second sheet, the battery cell having a cell tab protruding therefrom; and
a rigid frame suitable for robust datuming and disposed between the first sheet peripheral rim and the second sheet peripheral rim around at least a portion of the periphery of the first sheet peripheral rim and the second sheet peripheral rim adjacent abutting portions of the first sheet peripheral rim and the second sheet peripheral rim, the first sheet peripheral rim directly contacting the second sheet peripheral rim at the abutting portions, wherein the frame is fused to the coating layer of at least one of the first sheet peripheral rim and the second sheet peripheral rim, wherein the frame also extends around an outside edge of each of the first sheet peripheral rim and the second sheet peripheral rim to directly contact and cover the outside edges of the first sheet peripheral rim and the second sheet peripheral rim, and wherein the frame includes a notched portion to receive the cell tab therethrough.

* * * * *